June 25, 1935.  L. J. MILITELLO  2,005,919
SUGAR BOWL
Filed Sept. 22, 1934
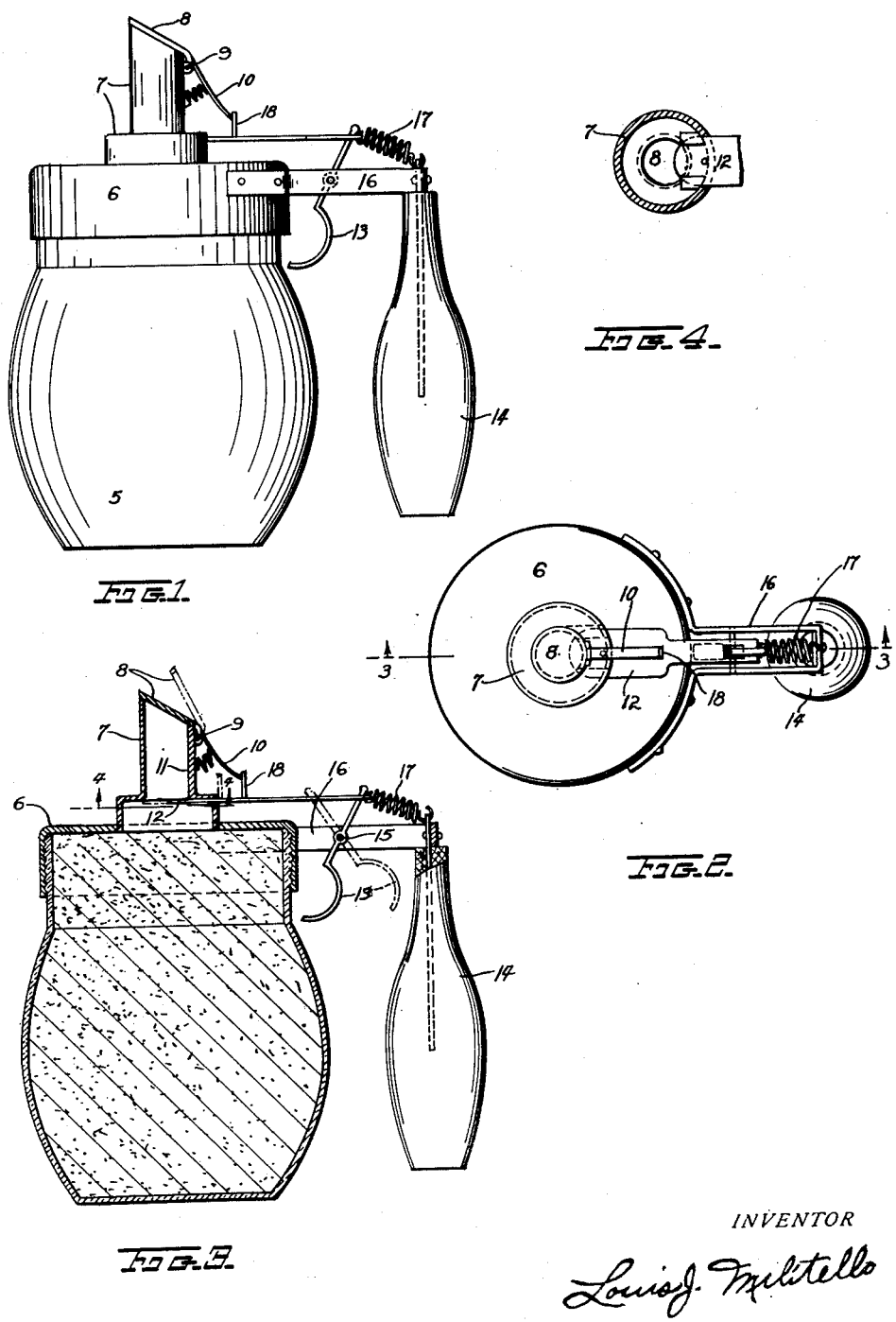
INVENTOR
Louis J. Militello Patented June 25, 1935

2,005,919

UNITED STATES PATENT OFFICE 2,005,919

SUGAR BOWL

Louis J. Militello, Wood River, Ill.

Application September 22, 1934, Serial No. 745,009

1 Claim. (Cl. 221—112)

My invention relates to sugar bowls more particularly of that type used in restaurants and in private homes and one of the principal objects of my invention is the provision of means for preventing too much sugar from pouring out of the bowl into the beverage cup when the sugar bowl is tipped.

Another object of my invention is the provision of means for regulating the quantity of sugar dispensed at each tipping of the bowl, thus permitting the exact predetermined quantity of sugar to be dispensed.

Another object of my invention is the provision of a sugar bowl having a handle, a spout with dispensing valves, and operating means adjacent the handle for operating the valves on the spout.

In the accompanying drawing, in which similar characters of reference refer to similar parts throughout the several views:—

Figure 1 is a side elevation of the sugar bowl.

Figure 2 is a top view of the sugar bowl.

Figure 3 is a vertical cross-sectional view of the sugar bowl in line 3—3 of Figure 2.

Figure 4 is a sectional view, looking upward, on the line 4—4 of Figure 3.

In the preferred embodiment of the invention shown in the drawing, the numeral 5 denotes the general contour of the usual sugar bowl which may be constructed of glass, metal or other usual material. The top of the open sugar bowl is covered by a cap 6 which may be screwed on to the bowl as shown or fastened in any other approved manner, the cap 6 being removed occasionally for refilling the bowl with sugar. Centrally disposed on the cap 6 is a cylindrical spout 7, the upper end of which is normally closed by a flap valve 8, hinged at 9 and opened by means of the lever 10 operating against the tension of spring 11. The lower end of the spout 7 is normally open but I have devised mechanism which, when the flap valve 8 is opened that simultaneously closes the lower end of the spout by means of slide valve 12, thus permitting only that particular quantity of sugar resident in the spout, from the slide valve 12 up to the flap valve 8, to be dispensed at each inversion of the bowl.

Both valves 8 and 12 are simultaneously operated by the person pulling the finger grip 13 towards the handle 14, the finger grip being pivoted at 15 to the handle support 16. The finger grip 13, is normally tensioned, by means of the spring 17, so that the flap valve 8 is closed and the slide valve 12 is open, but when the finger grip 13 is operated, as shown by the dotted lines in Figure 3, the flap valve 8 will be opened, permitting only the contents of the spout to be dispensed because the slide valve 12 will be simultaneously closed. This operation has permitted the person to pour only one spout full of sugar into his beverage cup while the sugar bowl was held in inverted position but, should an additional quantity of sugar be desired, it is only necessary to release the finger grip 13, which closes the flap valve 8 and opens the slide valve 12, permitting the spout 7 to again fill with sugar from the bowl 5; the pressing of the finger grip 13 thereafter again releasing an additional spout full of sugar to the beverage cup, (not shown), and so on. The lever 16, which actuates the flap valve 8 is attached to the strip 18 which in turn is attached to the approximate center of slide valve 12, the strip 18 having the function of limiting the inward movement of valve 12 as shown by the dotted line.

From the foregoing description it will be apparent that I have evolved a sugar bowl which permits a person, by holding the bowl in inverted position, to dispense any number of predetermined quantities of sugar allotments in a convenient and highly sanitary manner, without the use of spoons and which may be incidentally operated by one hand, leaving the other hand free to grasp the cup or for any other purpose.

While I have herein set forth a certain preferred embodiment of my invention, it is understood that I may vary from the same in minor details, not departing from the spirit of my invention, so as best to construct a practical device for the purpose intended, as defined in the appended claim.

I claim:

A sugar bowl provided with a cover, a spout attached to and projecting upwardly from said cover, two valves on the spout, one of said valves being caused to simultaneously open while the other valve closes and vice versa, a handle attached to the sugar bowl and means on the handle for conveniently operating said valves with one hand.

LOUIS J. MILITELLO.